(12) United States Patent
Kumar (10) Patent No.: US 11,519,445 B2
(45) Date of Patent: Dec. 6, 2022

(54) CONNECTING CLIP INCORPORATING A SPRING STRUCTURE

(71) Applicant: Toyota Motor Engineering & Manufacturing North America, Inc., Plano, TX (US)

(72) Inventor: Praveen Kumar, Ann Arbor, MI (US)

(73) Assignee: Toyota Motor Engineering & Manufacturing North America, Inc.., Plano, TX (US)

(*) Notice: Subject to any disclaimer, the term of this patent is extended or adjusted under 35 U.S.C. 154(b) by 550 days.

(21) Appl. No.: 16/424,696

(22) Filed: May 29, 2019

(65) Prior Publication Data

US 2020/0378428 A1 Dec. 3, 2020

(51) Int. Cl.
F16B 21/08 (2006.01)
B60R 13/02 (2006.01)

(52) U.S. Cl.
CPC ........ F16B 21/086 (2013.01); B60R 13/0206 (2013.01)

(58) Field of Classification Search
CPC .... F16B 21/086; F16B 5/0628; Y10T 24/309; Y10T 24/30
See application file for complete search history.

(56) References Cited

U.S. PATENT DOCUMENTS

| 4,716,633 | A | 1/1988 | Rizo | |
|---|---|---|---|---|
| 4,778,320 | A | 10/1988 | Nakama | |
| 4,883,382 | A * | 11/1989 | Mushya | F16B 37/0842 24/297 |
| 4,920,618 | A * | 5/1990 | Iguchi | F16B 13/061 24/297 |
| 5,421,067 | A | 6/1995 | Akachi et al. | |
| 5,630,256 | A | 5/1997 | Kanno | |
| 5,651,634 | A * | 7/1997 | Kraus | F16B 5/0628 403/408.1 |
| 5,689,863 | A | 11/1997 | Sinozaki | |
| 6,526,634 | B1 * | 3/2003 | Hsieh | F16B 21/086 24/453 |
| 6,666,640 | B1 * | 12/2003 | Hsieh | H01L 23/4093 24/453 |
| 7,114,221 | B2 | 10/2006 | Gibbons et al. | |

(Continued)

FOREIGN PATENT DOCUMENTS

DE 102011113241 A1 3/2012
DE 102013011254 A1 1/2015
(Continued)

*Primary Examiner* — Robert Sandy
*Assistant Examiner* — Michael S Lee
(74) *Attorney, Agent, or Firm* — Christopher G. Darrow; Darrow Mustafa PC (57) ABSTRACT

A clip is structured for coupling together a first component and a second component. The clip includes a body portion and an opposing wall residing opposite and spaced apart from the body portion. At least one connecting member spans a space between the body portion and the opposing wall to connect the body portion and the opposing wall. The at least one connecting member is structured to enable resilient movement of each of the body portion and the opposing wall with respect to the other one of the body portion and the opposing wall responsive to a force acting on the body portion and/or a force acting on the opposing wall.

11 Claims, 3 Drawing Sheets

(56) References Cited

U.S. PATENT DOCUMENTS

| | | |
|---|---|---|
| 7,179,039 B2 | 2/2007 | Schwartz et al. |
| 8,359,715 B2 | 1/2013 | Turner et al. |
| 8,561,256 B2 | 10/2013 | Mayer |
| 8,834,087 B2 | 9/2014 | Kirchen |
| 2006/0000064 A1* | 1/2006 | Leverger ............... F16B 21/09 24/297 |
| 2007/0098523 A1* | 5/2007 | Klein ................. B60R 13/0206 411/508 |
| 2008/0298890 A1* | 12/2008 | Koike .................. F16B 5/0628 403/408.1 |
| 2013/0031752 A1* | 2/2013 | Davies ................. F16B 5/0628 24/453 |
| 2014/0196259 A1* | 7/2014 | Kuhm .................. F16B 21/086 24/289 |
| 2015/0135484 A1* | 5/2015 | Leverger .............. F16B 13/045 24/292 |
| 2015/0353028 A1* | 12/2015 | Courtin ............... B60R 13/0206 24/293 |
| 2017/0002853 A1* | 1/2017 | Huet ..................... F16B 5/0657 |
| 2019/0039533 A1 | 2/2019 | Shioda et al. |
| 2020/0263720 A1* | 8/2020 | Kluge ...................... F16B 2/22 |

FOREIGN PATENT DOCUMENTS

| | | |
|---|---|---|
| FR | 2611824 A1 | 9/1988 |
| FR | 2993328 A1 | 1/2014 |
| JP | 2003214470 A | 7/2003 |
| JP | 2006052806 A | 2/2006 |
| KR | 100901390 B1 | 6/2009 |
| KR | 100963332 A | 12/2009 |
| WO | 0229260 A1 | 4/2002 |
| WO | 2014099444 A1 | 6/2014 |
| WO | 2018028954 A1 | 2/2018 |

\* cited by examiner

CONNECTING CLIP INCORPORATING A SPRING STRUCTURE

The subject matter described herein relates in general to fasteners and, more particularly, to a fastener usable for connecting portions of a vehicle.

BACKGROUND

Relatively rigid connections provided by clips and fasteners usable for connecting components of vehicles may cause problems with NVH (noise, vibration, and harshness). For example, vibrations from vehicle contact with a road surface and operation of other vehicle components (such as the engine) may be transmitted between components connected by the clip, producing audible rattling, humming, or other noises. Also, the relative rigidity of the connections may increase the effective magnitudes of the stresses applied to the clip. This may adversely affect the clip both in impact and vibration scenarios.

SUMMARY OF THE INVENTION

In one aspect of the embodiments described herein, a clip is structured for coupling together a first component and a second component. The clip includes a body portion and an opposing wall residing opposite and spaced apart from the body portion. At least one connecting member spans a space between the body portion and the opposing wall to connect the body portion and the opposing wall. The at least one connecting member is structured to enable resilient movement of each of the body portion and the opposing wall with respect to the other one of the body portion and the opposing wall responsive to a force acting on the body portion and/or a force acting on the opposing wall.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

In one or more arrangements described herein, a clip is provided for coupling together a first component and a second component. The clip includes a body portion and an opposing wall residing opposite and spaced apart from the body portion. One or more connecting members span a space between the body portion and the opposing wall to connect the body portion and the opposing wall. The connecting member(s) are structured to enable resilient movement of each of the body portion and the opposing wall with respect to the other one of the body portion and the opposing wall responsive to a force acting on the body portion and/or a force acting on the opposing wall. The connecting member(s) and the space formed between the body portion and the opposing wall are structured to function as an energy-absorbing spring-like structure permitting movement of the body portion and the opposing wall with respect to each other responsive to forces applied to a component (such as a vehicle component) connected to the body portion and/or to a component connected to the opposing wall.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 2A-3C, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar reference numerals in different figures refer to elements common to the different figures. Also, numerous specific details are set forth in order to provide a thorough understanding of the embodiments described herein. However, it will be understood by those of ordinary skill in the art that the embodiments described herein can be practiced without these specific details.

Figure 1A:
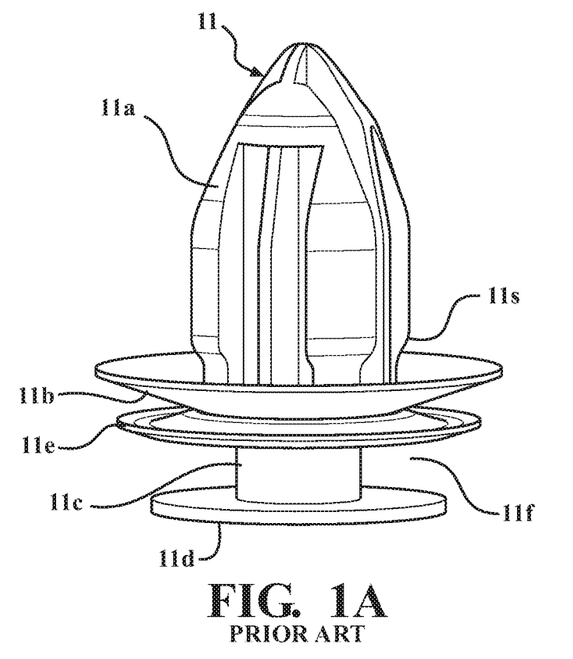
FIG. 1A is a schematic side perspective view of an embodiment of a prior art clip usable for connecting or fastening together two components.
Figure 1B:
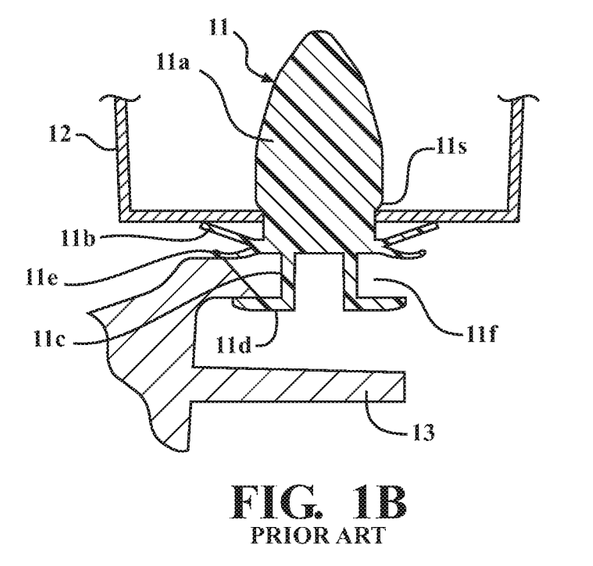
FIG. 1B is a schematic side cross-sectional view of the clip shown in FIG. 1A, in a use environment where the clip connects or fastens together two components.

FIGS. 1A-1B show the structure and operation of an embodiment of a prior art clip 11 usable for connecting or fastening together two components, for example components of a vehicle. FIG. 1A is a schematic side perspective view of the prior art clip. FIG. 1B is a schematic side cross-sectional view of the clip shown in FIG. 1A, in a use environment where the clip connects or fastens together two components 12 and 13. In one example, such a clip may be used in an interior cabin of a vehicle (not shown), where component 12 may be a vehicle ceiling and component 13 may be a headliner. However, an embodiment of the clip described herein may be used to connect any of a variety of different types of components together.

Referring to FIGS. 1A-1B, clip 11 may have a body portion 11a. Body portion 11a may include a shoulder 11s extending along an outer surface of the body portion. A resilient first flange 11b may extend outwardly from the body portion 11a. A connecting wall 11c may extend from the body portion 11a. A second flange 11d may extend outwardly from the connecting wall 11c. An intermediate flange 11e may also extend from the body portion 11a between the first flange 11b and the connecting wall 11c. As seen in FIG. 1B, component 12 may be secured to the clip 11 by positioning the component between the first flange 11b and the shoulder 11s.

As seen in FIG. 1A, each of first flange 11b and intermediate flange 11e may extend circumferentially continuously from an outer surface of the body portion 11a (i.e., without a gap in the flange along the outer surface of the body portion 11a or elsewhere along the extent of the flange). In a similar manner, second flange 11d may extend circumferentially continuously from an outer surface of the connecting wall 11c. As seen in FIG. 1B, a cavity 11f may be formed between intermediate flange 11e, connecting wall 11c, and second flange 11d. Cavity 11f may be structured to receive a portion of a component 13 therein between intermediate flange 11e and second flange 11d, to secure the component 13 to the clip 11 and to fasten the component 13 to the component 12.

The clip structure shown in FIGS. 1A-1B may provide mechanically stable, but relatively rigid clip contact surfaces connecting the components 12 and 13. The relatively rigid connections shown may cause problems with NVH (noise, vibration, and harshness). For example, in a vehicle application, vibrations from vehicle contact with a road surface and operation of other vehicle components (such as the engine) may be transmitted from one of the connected components 12, 13 to the other component, producing audible rattling, humming, or other noises. Also, the relative rigidity of the connections may increase the effective magnitudes of the stresses applied to the clip 11. This may adversely affect the clip both in impact and vibration scenarios. For example, a large number of relatively higher-magnitude stress cycles applied to the clip may shorten the service life of the clip and lead to reliability problems. In the vehicle application described, for example, loads on the clip 11 may be caused by inertia from the weight of the headliner 13, by the weight of object(s) attached to the headliner, and impact loads on the headliner 13 due to the heads of vehicle users.

FIGS. 2A-3C are views of resilient fastening clips 30 and 60 in accordance with embodiments described herein. Embodiments of the clips may be structured for coupling together a first component 12 and a second component 13, in a manner similar to that previously described.

Figures 2A, 2B, 2C:
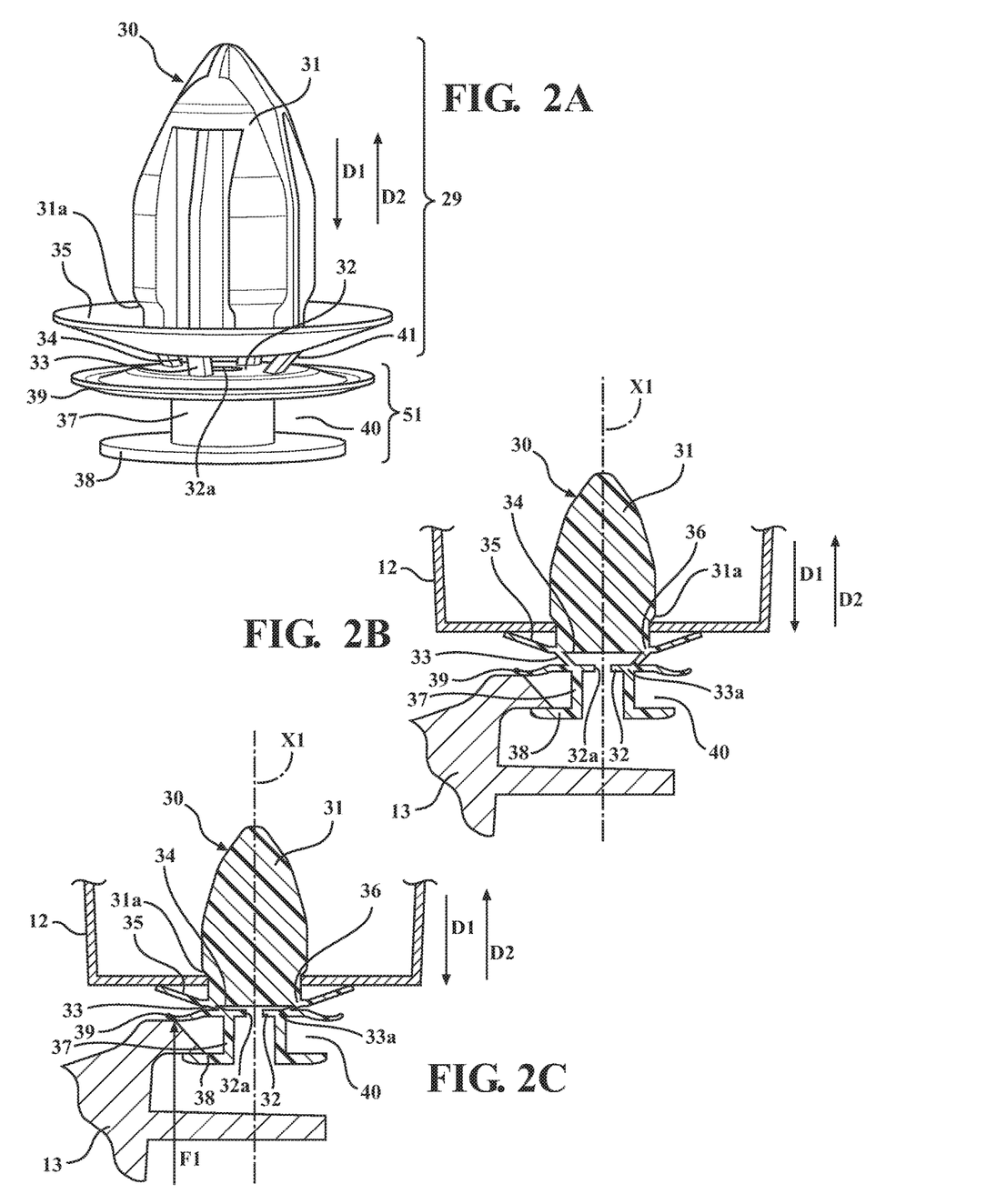
FIG. 2A is a schematic side perspective view of a resilient fastening clip in accordance with an embodiment described herein.
FIG. 2B is a schematic side cross-sectional view of the clip embodiment shown in FIG. 2A, with components attached to the clip and showing the clip absent vibration, impact, or other incidental loads applied to clip by the components.
FIG. 2C is the view of FIG. 2B showing the clip during application of forces to one or more of the attached components, resulting in resilient deformation of portions of the clip.

FIG. 2A is a schematic side perspective view of a first embodiment 30 the resilient clip. FIG. 2B is a schematic side cross-sectional view of the first embodiment of the clip shown in FIG. 2A, with components 12 and 13 attached to the clip 30 and showing the clip absent vibration, impact, or other incidental loads applied to the clip via components 12 and 13. FIG. 2C is the view of FIG. 2B showing the clip 30 during application of forces to one or more of components 12, 13 resulting in resilient deformation of portions of the clip 30.

In one or more arrangements, the clip 30 may include a body portion 31 and an opposing wall 32 residing opposite and spaced apart from the body portion 31. Body portion 31 may include a shoulder 31a extending along an outer surface of the body portion. At least one connecting member 33 may span a space or gap 34 between the body portion 31 and the opposing wall 32 to connect the body portion 31 and the opposing wall 32. Although the embodiment shown in FIGS. 2A-2C incorporates a plurality of discrete, spaced-apart connecting members 33 connecting the body portion 31 and the opposing wall 32, a single connecting member may alternatively be used. The space 34 between the body portion 31 and the opposing wall 32 may provide a space for movement of the body portion 31 and/or the opposing wall 32 relative to each other when the clip 30 is loaded by movement of one or more of the components 12 and 13, as described herein. In addition, the connecting members 33 may be structured to enable resilient movement of each of the body portion 31 and the opposing wall 32 with respect to the other one of the body portion and the opposing wall responsive to a force acting on the body portion and also responsive to a force acting on the opposing wall. More specifically, the body portion 31, the connecting members 33 and the opposing wall 32 may be structured so that the body portion 31 is resiliently movable in a direction D1 toward the opposing wall 32 responsive to a force acting on the body portion 31 in the direction toward the opposing wall 32. The body portion 31, the connecting members 33 and the opposing wall 32 may also be structured so that the opposing wall 32 is resiliently movable in a direction D2 toward the body portion 31 responsive to a force acting on the opposing wall 32 in the direction of the body portion 31. Also, the body portion 31, the connecting members 33, and the opposing wall 32 may be structured so that the body portion 31 is resiliently movable in a direction away from the opposing wall 32 responsive to a force acting on the body portion 31 in a direction away from the opposing wall 32. In addition, the body portion 31, the connecting members 33, and the opposing wall 32 may be structured so that the opposing wall 32 is resiliently movable in a direction away from the body portion 31 responsive to a force acting on the opposing wall 32 in a direction away from the body portion 31. In such arrangements, the connecting members 33 and the space 34 separating the body portion 31 and the opposing wall 32 may provide a spring structure capable of resiliently absorbing energy (such as vibrational energy and shock energy) acting on the component 12 in contact with the body portion 31 and on the component 13 in contact with the opposing wall 32.

Figures 3A, 3B, 3C:
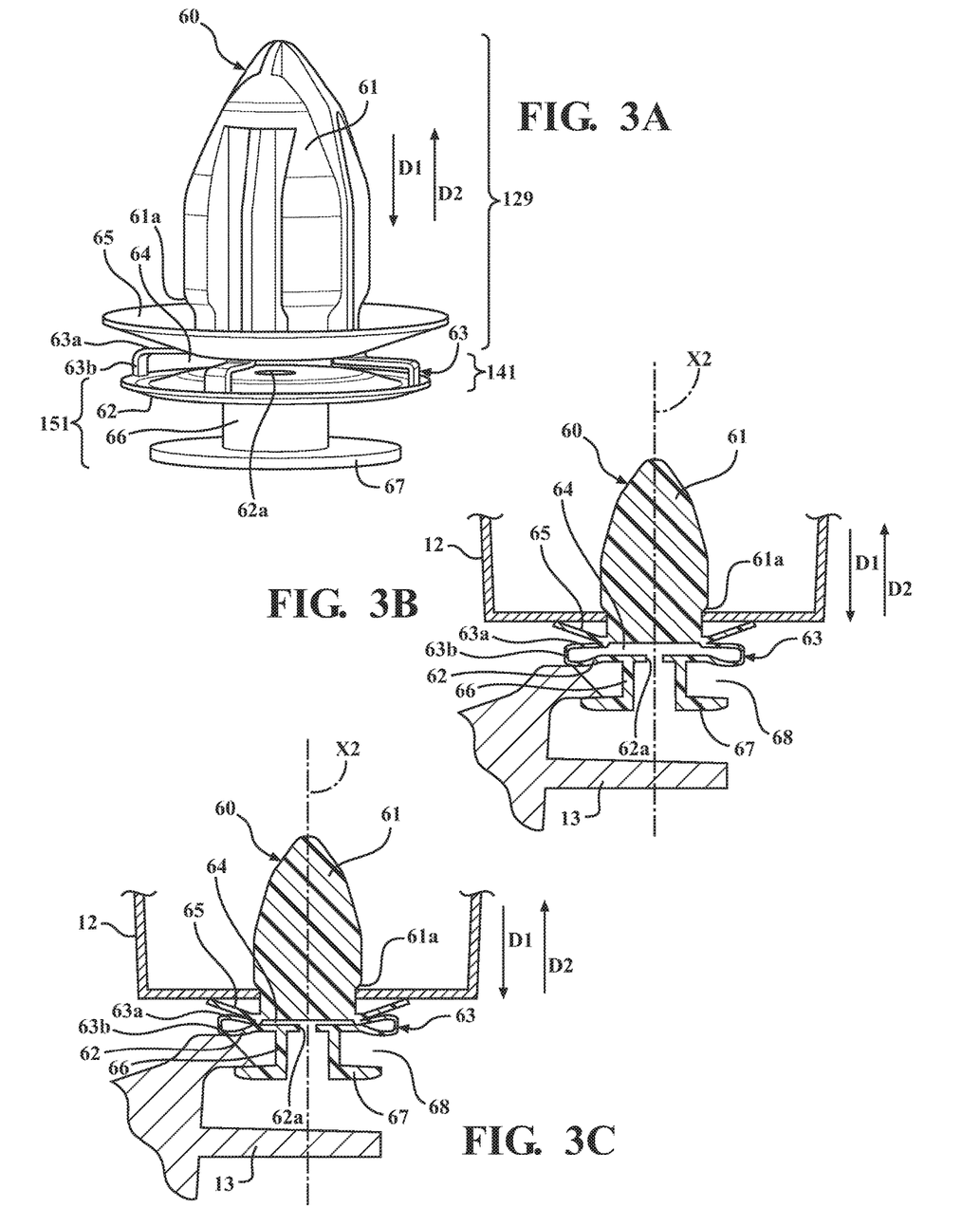
FIG. 3A is a schematic side perspective view of a fastening clip in accordance with another embodiment described herein.
FIG. 3B is a schematic side cross-sectional view of the clip of FIG. 3A, with components attached to the clip and showing the clip absent vibration, impact, or other incidental loads applied to the clip by the components.
FIG. 3C is the view of FIG. 3B showing the clip during application of forces to one or more of the attached components, resulting in resilient deformation of portions of the clip.

The terms "resilient movement" and "resiliently movable" are understood to mean that the connections between the body portion 31 and the opposing wall 32 provided by the connecting members 33 are structured to maintain the body portion 31 and the opposing wall 32 in a first spatial relationship when the vehicle is at rest and no forces are acting on the body portion 31 and the opposing wall 32 other than those due to the weights of the components 12 and 13 connected by the clip when the vehicle is at rest (the weights of the portions of the clip may be considered negligible). Examples of such a first spatial relationship are shown in FIGS. 2B and 3B.

The connecting members 33 may be structured to enable the body portion 31 and the opposing wall 32 to move with respect to each other (i.e., out of the first spatial relationship) responsive to forces applied to one or more of the body portion 31 and the opposing wall 32 due to, for example, externally applied forces acting on the connected components 12 and 13 and/or due to inertia of the connected components during motion of the vehicle. Non-exclusive examples of such resilient movement of elements of the clip out of respective first spatial relationships are shown in FIGS. 2C and 3C. To this end, the connecting members 33 may be structured and connected to the body portion 31 and the opposing wall 32 so as to be resiliently deflectable with respect to the body portion 31 and the opposing wall 32 responsive to the applied forces. The connecting members 33 may also be structured to exert forces on the body portion 31 and the opposing wall 32 which tend to return the body portion 31 and the opposing wall 32 to the first spatial relationship upon removal of the forces applied to the body portion 31 and/or the opposing wall 32.

Opposing wall 32 may have an opening 32a (such as a circular opening) formed therein to help accommodate relative motion and deflection of the opposing wall 32 without producing additional stresses on the opposing wall.

Referring to FIGS. 2A-2C, a resilient body portion flange 35 (similar to flange (11b of FIGS. 1A and 1B) may extend from an outer surface of the body portion. The clip 30 may be structured so that a force acting on the body portion 31 is applicable to the body portion through the body portion flange 35. Thus, for example, a force acting in direction D1 and exerted by (or transmitted through) component 12 may be transmitted to the body portion 31 via body portion flange 35. This force may cause the body portion 31 to move in direction D1 toward space 34 and opposing wall 32. As seen in FIGS. 2B and 2C, component 12 may be secured to the clip 30 by positioning the component between the body portion flange 35 and the shoulder 31a.

Each of the flanges described herein may extend circumferentially continuously from an outer surface of the portion of the clip to which they are attached (i.e., without a gap in the flange along the outer surface of the body portion 31 or elsewhere along the extent of the flange). For example, body portion flange 35 may extend circumferentially continuously from an outer surface of the body portion 31.

The connecting members 33 may be structured to be resiliently deflectable responsive to a force (such as a force in direction D1) acting on the body portion flange 35. In one or more particular arrangements, the body portion flange 35 may extend outwardly from intersections 36 between the body portion 31 and the connecting members 33, as shown in FIGS. 2A-2C.

The clip 30 may further include a connecting wall 37 extending from the opposing wall 32. The clip 30 may be structured so that a force acting on the opposing wall 32 is applicable to the opposing wall through the connecting wall 37. In addition, a connecting wall flange 38 may extend from the connecting wall 37. Clip 30 may be structured so that a force acting on the connecting wall 37 is applicable to the connecting wall through the connecting wall flange 38.

In the particular embodiment shown in FIGS. 2A-2C, the connecting members 33 extend from the body portion 31 in a direction toward a central axis X1 of the body portion. Also, in the particular embodiment shown in FIGS. 2A-2C, the connecting members 33 may be structured to be resiliently deflectable responsive to the forces acting on the opposing wall 32. This may enable the opposing wall 32 to resiliently move toward the body portion 31 and may enable the body portion 31 to resiliently move toward the opposing wall 32 responsive to forces acting on the components 12, 13 connected by the clip 30. Thus, the components 12, 13 may move with respect to each other (including toward each other and away from each other) responsive to the applied forces.

In the embodiment shown in FIGS. 2A-2C, a resilient intermediate flange 39 may be positioned between the body portion flange 35 and the connecting wall flange 38. In one or more arrangements, the intermediate flange 39 may extend from the connecting wall 37 adjacent the opposing wall 32. In particular arrangements, the intermediate flange 39 may extend from the connecting wall 37 at an intersection 33a between the opposing wall 32 and the connecting wall 37, at a location on the connecting wall 37 directly opposite the opposing wall 32. In this manner, the clip 30 may be structured so that a force acting on the opposing wall 32 is applicable through the intermediate flange 39. In the embodiment shown in FIGS. 2A-2C, the intermediate flange 39, the connecting wall 37, and the connecting wall flange 38 may combine to define a cavity 40 therebetween. Cavity 40 may structured to receive a portion of a component 13 therein between intermediate flange 39 and connecting wall flange 38, to secure the component 13 to the clip 30 and to fasten the component 13 to the component 12.

Referring to FIGS. 2B and 2C, in one example of application of forces to the clip, a force acting in direction D1 and exerted by component 13 on the clip 30 may be transmitted through connecting wall flange 38 to connecting wall 37, then by connecting wall 37 to the opposing wall 32. The applied force may cause the connecting members 33 to resiliently deflect as the opposing wall 32 is forced in direction D1, away from the body portion 31, as the deflecting connecting members 33 absorb the applied force. Such a relative movement of one of the body portion 31 and the opposing wall 32 away from the other one of the body portion 31 and the opposing wall 32 may produce an enlargement of the space 34. In this manner, the space 34 functions as a portion of a spring structure to accommodate resilient relative movement of the body portion 31 and/or the opposing wall 32.

Referring to FIGS. 2B and 2C, in another example of application of forces to the clip 30, a force F1 acting in direction D2 opposite direction D1 may be exerted by component 13 on the clip. This force may be transmitted through intermediate flange 39 to the opposing wall 32, which may cause the connecting members 33 to resiliently deflect in direction D2 as opposing wall 32 moves in direction D2 toward body portion 31, and as the deflecting connecting members 33 absorb the applied force. Such a relative movement of one of the body portion 31 and the opposing wall 32 toward the other one of the body portion 31 and the opposing wall 32 may produce a shrinkage of the space 34 as shown in FIG. 2B. In this manner, the space 34 functions as a portion of a spring structure to accommodate resilient relative movement of the body portion 31 and/or the opposing wall 32.

In another example of application of forces to the clip 30, a force acting in direction D1 and exerted by component 12 on the clip may be transmitted through body portion flange 35 to the body portion 31. This may produce a resilient deflection of connecting members 33 with respect to the body portion 31, allowing the body portion 31 to move toward the opposing wall 32 as the deflecting connecting members absorb the applied force.

FIG. 3A is a schematic side perspective view of a second embodiment 60 the resilient clip. FIG. 3B is a schematic side cross-sectional view of the second embodiment 60 of the clip, with components 12 and 13 attached to the clip and showing the clip absent vibration, impact, or other incidental loads applied to the clip via components 12 and 13. FIG. 3C is the view of FIG. 3B showing the clip 60 during application of forces to one or more of components 12, 13 resulting in resilient deformation of portions of the clip 60.

In one or more arrangements, the clip 60 may include a body portion 61 and an opposing wall 62 residing opposite and spaced apart from the body portion 61. Body portion 61 may include a shoulder 61a extending along an outer surface of the body portion. At least one connecting member 63 may span a space or gap 64 between the body portion 61 and the opposing wall 62 to connect the body portion 61 and the opposing wall 62. Although the particular embodiment shown in FIGS. 3A-3C incorporates a plurality of connecting members 63 connecting the body portion 61 and the opposing wall 62, a single connecting member 63 may alternatively be used. The space 64 between the body portion 61 and the opposing wall 62 may provide a space for movement of the body portion 61 and/or the opposing wall 62 relative to each other when the clip 60 is loaded by movement of one or more of the components 12 and 13. In addition, the connecting members 63 may be structured to enable resilient movement of each of the body portion 61 and the opposing wall 62 with respect to the other one of the body portion and the opposing wall responsive to a force acting on the body portion and also responsive to a force acting on the opposing wall 62. More specifically, as in the previously described embodiment, the body portion 61, the connecting members 63 and the opposing wall 62 may be structured so that the body portion 61 is resiliently movable in a direction D1 toward the opposing wall 62 responsive to a force acting on the body portion 61 in a direction toward the opposing wall 62. The body portion 61, the connecting members 63 and the opposing wall 62 may also be structured so that the opposing wall 62 is resiliently movable in a direction D2 toward the body portion 61 responsive to a force acting on the opposing wall 62 in the direction of the body portion 61. Also, the body portion 61, the connecting members 63, and the opposing wall 62 may be structured so that the body portion 61 is resiliently movable in a direction away from the opposing wall 62 responsive to a force acting on the body portion 61 in a direction away from the opposing wall 62. In addition, the body portion 61, the connecting members 63, and the opposing wall 62 may be structured so that the opposing wall 62 is resiliently movable in a direction away from the body portion 61 responsive to a force acting on the opposing wall 62 in a direction away from the body portion 61. In such arrangements, the connecting members 63 and the space 64 separating the body portion 61 and the opposing wall 62 may provide a spring structure capable of resiliently absorbing energy (such as vibrational energy and shock energy) acting on the component 12 in contact with the body portion 61 and on the component 13 in contact with the opposing wall 62.

The connecting members 63 may be structured to enable the body portion 31 and the opposing wall 62 to move with respect to each other (i.e., out of the first spatial relationship) responsive to forces applied to one or more of the body portion 61 and the opposing wall 62 due to, for example, externally applied forces acting on the connected components 12 and 13 and/or due to inertia of the connected components during motion of the vehicle. As stated previously, non-exclusive examples of such resilient movement of elements of the clip out of respective first spatial relationships are shown in FIGS. 2C and 3C. To this end, the connecting members 63 may be structured and connected to the body portion 61 and the opposing wall 62 so as to be resiliently deflectable with respect to the body portion 61 and the opposing wall 62 responsive to the applied forces. The connecting members 63 may also be structured to exert forces on the body portion 61 and the opposing wall 62 which tend to return the body portion 61 and the opposing wall 62 to the first spatial relationship upon removal of the forces applied to the body portion 61 and/or the opposing wall 62.

Opposing wall 62 may have an opening 62a (such as a circular opening) formed therein to help accommodate relative motion and deflection of the opposing wall 62 without producing additional stresses on the opposing wall.

Referring to FIGS. 3A-3C, a resilient body portion flange 65 may extend from an outer surface the body portion 61. The clip 60 may be structured so that a force acting on the body portion 61 is applicable to the body portion through the body portion flange 65. Thus, for example, a force acting in direction D1 and exerted by (or transmitted through) component 12 may be transmitted to the body portion 61 via body portion flange 65. This force may cause the body portion 61 to move in direction D1 toward space 64 and opposing wall 62. The connecting members 63 may be structured to be resiliently deflectable responsive to a force (such as the force in direction D1) acting on the body portion flange 65. As seen in FIGS. 3B and 3C, component 12 may be secured to the clip 60 by positioning the component between the body portion flange 65 and the shoulder 61a.

In the embodiment shown in FIGS. 3A-3C, each of the connecting members 63 may have a first portion 63a extending outwardly in a direction away from a central axis X2 of the body portion 61, and another portion 63b extending from the first portion 63a in a direction toward the opposing wall 62. Also, in this embodiment, in one or more arrangements, the opposing wall 62 may be structured to be resiliently deflectable responsive to a force acting on the opposing wall, either from the connecting members 63 or the connecting wall 66 (described below). In addition, the connecting members 63 may be structured to be resiliently deflectable responsive to forces acting on (and applied through) the opposing wall 62. These features may enable the opposing wall 62 to resiliently move toward the body portion 61 and may enable the body portion 61 to resiliently move toward the opposing wall 62 responsive to forces acting on the components 12, 13 connected by the clip 60. Thus, the components may move with respect to each other (including toward each other and away from each other) responsive to the applied forces.

The clip 60 may further include a connecting wall 66 extending from the opposing wall 62. The clip 60 may be structured so that a force acting on the opposing wall 62 is applicable to the opposing wall through the connecting wall 66. In addition, a connecting wall flange 67 may extend from the connecting wall 66. Clip 60 may be structured so that a force acting on the connecting wall 66 is applicable to the connecting wall through the connecting wall flange 67, in a manner similar to that described with regard to FIGS. 2A-2C.

In the embodiment shown in FIGS. 3A-3C, the opposing wall 62, the connecting wall 66, and the connecting wall flange 67 may combine to define a cavity 68 therebetween. Cavity 68 may structured to receive a portion of a component 13 therein between opposing wall 62 and the connecting wall flange 67, to secure the component 13 to the clip 60 and to fasten the component 13 to the component 12. Also, as seen from FIGS. 3A-3B, this embodiment of the clip may be structured so that a force acting on the opposing wall 62 is applicable directly to the opposing wall.

Referring to FIGS. 3A-3B, in one example of application of forces to the clip 60, a force acting in direction D1 and exerted by component 13 on the clip may be transmitted through connecting wall flange 67 to connecting wall 66, then by connecting wall 66 to the opposing wall 62. The applied force may cause the opposing wall 62 to resiliently deflect as the opposing wall is forced in direction D1 away from the body portion 61, as the deflecting opposing wall 62 absorbs the applied force. Such a relative movement of one of the body portion 61 and the opposing wall 62 away from the other one of the body portion 61 and the opposing wall 62 may produce an enlargement of the space 64. In this manner, the space 64 functions as a portion of a spring structure to accommodate resilient relative movement of the body portion 61 and/or the opposing wall 62.

In another example of application of forces to the clip 60, a force acting in direction D2 opposite direction D1 may be exerted by component 13 on the clip 60. This force may be transmitted through opposing wall 62, which may cause end portions of the connecting members 63 to resiliently deflect in direction D2 as opposing wall 62 moves in direction D2 toward body portion 61, and as the deflecting opposing wall 62 and/or connecting members 63 absorb the applied force. Such a relative movement of one of the body portion 61 and the opposing wall 62 toward the other one of the body portion 61 and the opposing wall 62 may produce a shrinkage of the space 64 as shown in FIG. 3B. In this manner, the space 64 functions as a portion of a spring structure to accommodate resilient relative movement of the body portion 61 and/or the opposing wall 62.

In another example of application of forces to the clip 60, a force acting in direction D1 and exerted by component 12 on the clip may be transmitted through body portion flange 65 to the body portion 61. This may produce a resilient deflection of connecting members 63 with respect to the body portion 61, allowing the body portion 61 to move toward the opposing wall 62 as the deflecting connecting members 63 absorb the applied force. Such a relative movement of one of the body portion 61 and the opposing wall 62 toward the other one of the body portion 61 and the opposing wall 62 may also produce a shrinkage of the space 64 as shown in FIG. 3B. In this manner, the cavity 64 accommodates resilient relative movement of the body portion 61 and/or the opposing wall 62.

As described herein, due to the structures of the clip embodiments, the forces applied through the clip may produce resilient deflection of portions of the clip. The clip embodiments may also enable resilient movement of the components 12 and 13 toward and/or away from each other, and also laterally with respect to each other. As previously described, movement of the components 12, 13 and movement of portions of the clip are "resilient" in that the clip embodiments may return to the initial states shown in FIGS. 2A and 3A absent vibration, impact, or other incidental loads applied to the clip via components 12 and 13.

Each of the embodiments shown in FIGS. 2A-3C incorporates four connecting members angularly spaced apart at or about 90 degrees. However, any desired number of connecting members may be employed. A relative stiffness of the spring structure may be affected by increasing or increasing the number of connecting members. For example, increasing the number of connecting members may increase the stiffness of the spring structure. In addition, relative stiffness of the spring structure may be affected by adjusting the structural dimensions of the individual connecting members.

Because the clip structure provides energy absorption and deflects resiliently responsive to applied loading, the magnitudes of the forces acting on the clip may be effectively reduced. This may aid in extending the service life of the clip and in preventing failures of the clip due to excessive loading.

Referring again to the drawings, in another aspect of the embodiments described herein, the body portion 31 and the body portion flange 35 may, in combination, form an upper portion (generally designated 29) of the clip 30. The clip upper portion 29 may be secured to the component 12. In addition, the opposing wall 32, the connecting wall 37, and the connecting wall flange 38 may combine to form a lower portion (generally designated 51) of the clip 30. The clip lower portion 51 may be secured to the component 13. Also, the connecting members 33 may, in combination, form a spring-like "suspension" (generally designated 41) interposed between the clip upper portion 29 and the clip lower portion 51. The connecting members 33 of the suspension 41 may span the space 34 between the upper portion 29 and the lower portion 51 to provide a resilient coupling or connection between the upper portion 29 and the lower portion 51. This suspension 41 may be structured as described herein to enable resilient relative movement of each of the upper portion 29 and the lower portion 51 with respect to the other one of the upper portion 29 and the lower portion 51, responsive to vibrational, impact and/or other forces exerted on one or more of the upper portion 29 and the lower portion 51 by the components 12 and/or 13.

In yet another aspect of the embodiments described herein, the body portion 61 and the body portion flange 65 may, in combination, form an upper portion (generally designated 129) of the clip 60. The clip upper portion 129 may be secured to the component 12. In addition, the opposing wall 62, the connecting wall 66, and the connecting wall flange 67 may combine to form a lower portion (generally designated 151) of the clip 30. The clip lower portion 151 may be secured to the component 13. Also, the connecting members 63 may, in combination, form a spring-like "suspension" (generally designated 141) interposed between the clip upper portion 129 and the clip lower portion 151. The connecting members 63 of the suspension 141 may span the space 64 between the upper portion 129 and the lower portion 151 to provide a resilient coupling or connection between the upper portion 129 and the lower portion 151. This suspension 141 may be structured as described herein to enable resilient relative movement of each of the upper portion 129 and the lower portion 151 with respect to the other one of the upper portion 129 and the lower portion 151, responsive to vibrational, impact and/or other forces exerted on one or more of the upper portion 129 and the lower portion 151 by the components 12 and/or 13.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A clip structured for coupling together a first component and a second component, the clip comprising:
   a body portion;
   an opposing wall residing opposite and spaced apart from the body portion in a direction along a central axis of the body portion;
   a body portion flange extending from the body portion, the clip being structured so that a force acting on the body portion is applicable to the body portion through the body portion flange; and
   at least one connecting member spanning a space between the body portion flange and the opposing wall to connect the body portion flange and the opposing wall, the at least one connecting member including a first portion connected to the body portion flange, wherein the at least one connecting member is structured to enable resilient movement of each of the body portion flange and the opposing wall toward each other along the central axis responsive to a force acting on the body portion and/or a force acting on the opposing wall, and so as to enable the at least one connecting member first portion and the opposing wall to contact each other responsive to the force.

2. The clip of claim 1 wherein the at least one connecting member extends from the body portion in a direction toward a central axis of the body portion.

3. The clip of claim 1 wherein the at least one connecting member extends from the body portion in a direction away from a central axis of the body portion.

4. The clip of claim 1 wherein the opposing wall is structured to be resiliently deflectable responsive to a force acting on the opposing wall.

5. The clip of claim 1 wherein the at least one connecting member is structured to be resiliently deflectable responsive to a force acting on the body portion flange.

6. The clip of claim 1 wherein the body portion flange extends from an intersection between the body portion and the at least one connecting member.

7. The clip of claim 1 further comprising a connecting wall extending from the opposing wall, and wherein the clip is structured so that a force acting on the opposing wall is applicable to the opposing wall through the connecting wall.

8. The clip of claim 7 further comprising a connecting wall flange extending from the connecting wall, wherein the clip is structured so that a force acting on the connecting wall is applicable to the connecting wall through the connecting wall flange.

9. The clip of claim 8 further comprising an intermediate flange positioned between the body portion flange and the connecting wall flange and extending from the connecting wall adjacent the opposing wall, wherein the clip is structured so that a force acting on the opposing wall is applicable through the intermediate flange.

10. The clip of claim 9 wherein the intermediate flange extends from the connecting wall at an intersection between the opposing wall and the connecting wall.

11. The clip of claim 1 wherein the clip is structured so that a force acting on the opposing wall is applicable directly to the opposing wall.

* * * * *